F. J. & H. R. HUMPHREY.
GAS LAMP.
APPLICATION FILED FEB. 15, 1911.
1,051,592.
Patented Jan. 28, 1913.
3 SHEETS—SHEET 1.
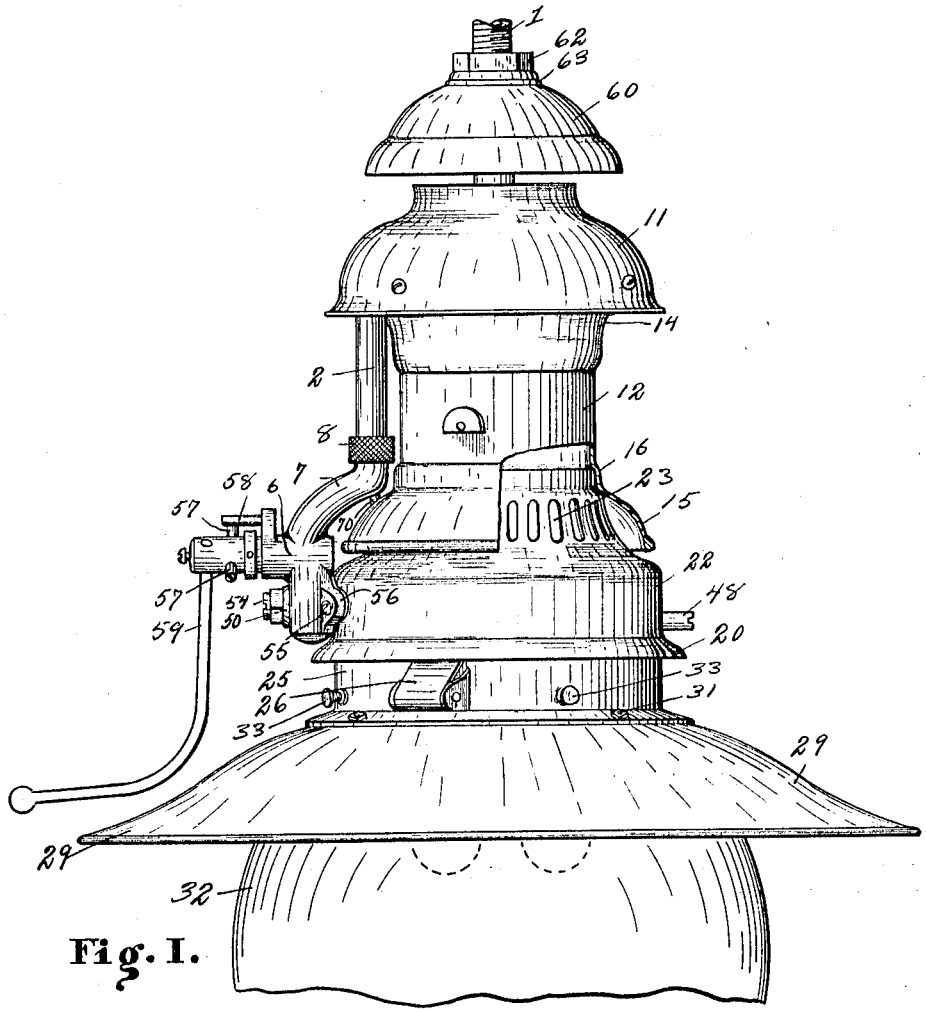
Fig. I.
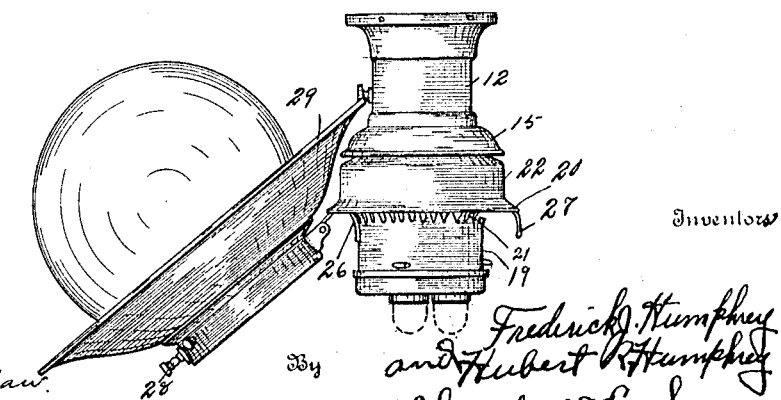
Fig. IV.
Witnesses
M. C. Woodruff
Margaret Shaw
Inventors
Frederick J. Humphrey
and Hubert R. Humphrey
By Chappell & Earl Attorneys

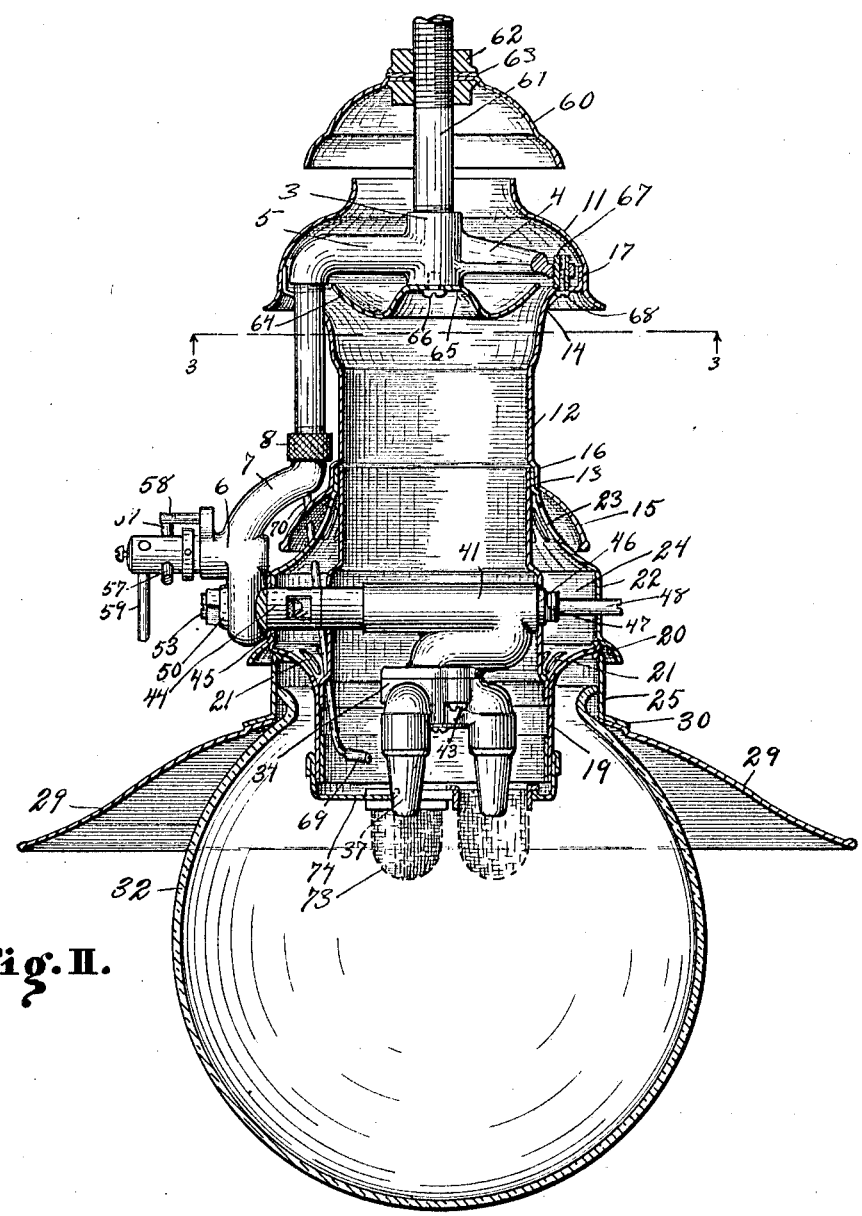

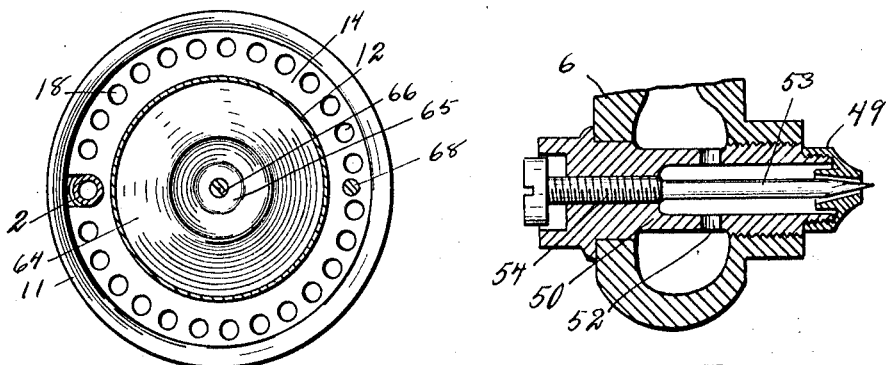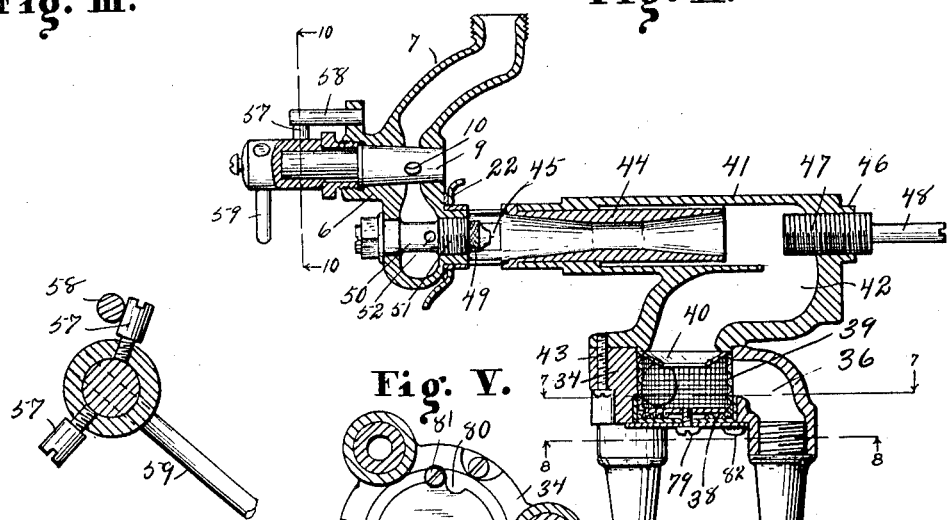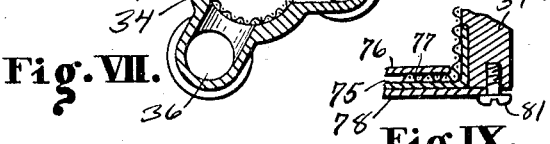

UNITED STATES PATENT OFFICE.

FREDERICK J. HUMPHREY AND HUBERT R. HUMPHREY, OF KALAMAZOO, MICHIGAN, ASSIGNORS TO GENERAL GAS LIGHT COMPANY, OF KALAMAZOO, MICHIGAN.

GAS-LAMP.

1,051,592.  Specification of Letters Patent.  Patented Jan. 28, 1913.

Application filed February 15, 1911. Serial No. 608,691.

*To all whom it may concern:*

Be it known that we, FREDERICK J. HUMPHREY and HUBERT R. HUMPHREY, citizens of the United States, residing at Kalamazoo, Michigan, have invented certain new and useful Improvements in Gas-Lamps, of which the following is a specification.

This invention relates to improvements in gas lamps.

The main objects of this invention are: First, to provide in a gas lamp of the inverted burner type an improved burner. Second, to provide an improved gas lamp in which all the parts are accessible for adjustment, or the cleaning or renewal of parts. Third, to provide in a gas lamp, an improved valve mechanism. Fourth, to provide in a gas lamp of the inverted burner type an improved chimney and casing structure. Fifth, to provide an improved gas lamp having inverted burners adapted for out-of-door use, or use in exposed places. Sixth, to provide in a gas lamp an improved arrangement of burner screen. Seventh, to provide an improved gas lamp having a plurality of burners in which the parts are comparatively simple and economical in structure and easily assembled.

Further objects, and objects relating to structural details will definitely appear from the detailed description to follow.

We accomplish the objects of our invention by the devices and means described in the following specification.

The invention is clearly defined and pointed out in the claims.

A structure which is a preferred embodiment of our invention is clearly illustrated in the accompanying drawing, forming a part of this invention, in which:

Figure I is a side elevation of a structure embodying the features of our invention, a portion of the chimney being broken away to show structural details thereof, the supply pipe and the lower portion of the globe being also broken away. Fig. II is a vertical central section through the chimney shade and globe, the burner valves and the pipes being shown in full lines. Fig. III is a horizontal section taken on a line corresponding to line 3—3 of Fig. II. Fig. IV is a side elevation with the globe and shade in their open position, the gas supply pipe and the top of the chimney and chimney hood being omitted. Fig. V is a detail vertical central section through the burner and the gas supply valve casing, the valves being shown in full lines. Fig. VI is an enlarged vertical central section through the gas delivery nozzle, the regulating valve therefor being shown in full lines. Fig. VII is a horizontal section taken on a line corresponding to line 7—7 of Fig. V. Fig. VIII is a detail horizontal section taken on a line corresponding to line 8—8 of Fig. V. Fig. IX is an enlarged detail taken on a line corresponding to line 9—9 of Fig. VIII. Fig. X is a vertical section through the supply valve stem taken on a line corresponding to line 10—10 of Fig. V. Fig. XI is a detail vertical section of a slightly modified construction, the modification being mainly in the arrangement of the screen in the burner.

In the drawing, similar reference characters refer to similar parts throughout the several views, and the sectional views are taken looking in the direction of the little arrows at the ends of the section lines.

Referring to the drawing, 1 represents the gas supply pipe. This pipe is connected to the delivery pipe 2 by means of the coupling 3. This coupling is provided with laterally-projecting arms 4 and 5, the arm 5 being an elbow pipe adapted to receive the upper end of the delivery pipe 2. The valve casing 6 is provided with an arm 7, which is detachably connected to the delivery pipe 2 by means of the sleeve coupling 8.

The valve 9 illustrated is of the rotary plug type, having a port 10 therethrough adapted to be brought into and out of register with the passage in the casing.

The chimney, in the structure illustrated, consists of the downwardly-flaring top section 11 arranged above the coupling 5, body sections 12 and 13 and the bottom section 19. The body section 12 is provided with a downwardly-flaring flange 15 at its lower end, and is preferably provided with an annular offset 16 adapted to receive the upper end of the lower body section 13. The flange 14 of the section 12 is provided with an upturned rim 17, fitting the top section 11, as illustrated. The flange 14 is provided with a plurality of openings 18, adjacent to its edge, or adjacent to the rim 17. The bottom section 19 is arranged on the lower end of the section 13. This bottom section has an outwardly-flaring flange 20 on its upper end, having air inlet openings 21 therein.

A downwardly-flaring casing 22 is arranged about the lower part of the chimney, its upper end being arranged under the flange 15 on the chimney section 12. The casing is provided with air inlets 23 at its upper end, the flange 15 covering the opening, as clearly appears in Fig. II. The lower end of the casing rests upon the flange 20 on the bottom of the chimney section 19. The upper end of the casing is preferably arranged in the offset 13 of the section 12. The casing and chimney form an annular air chamber 24, having air openings at its upper and lower ends.

The globe and shade supporting ring 25 is pivoted on the arm 26 of one side of the chimney, the arm 27 being arranged on the opposite side to coact with the catch pin 28 for retaining the ring in its closed position. This ring is adapted to close into the bottom of the casing 22. The shade 29 is secured on the underside of the outwardly-projecting flange 30 on the globe supporting ring. The shade is formed of sheet metal and rigidly secured to the ring, as by means of the screws or rivets 31, and when the parts are enameled, as we generally finish them, the shade is enameled with the globe supporting ring. The globe 39 fits into the globe supporting ring and is supported therein by means of the thumb screw 33. The globe incloses the lower end of the chimney and directs the air from the chamber 24 to the burners.

Our improved burner comprises a body or burner member proper 34 having a delivery chamber 35 therein and burner passages 36, leading to the burner tips 37. These tips are threaded into the member 34, as illustrated in Fig. V. The delivery chamber 35 is preferably cylindrical and opens at its upper end into the passage 42 of the inlet passage member 41. The lower end of the chamber 35 is in the structure detailed in Figs. V, VII and VIII, provided with an opening for the introduction of the screen 39. A closure 38 is provided for this opening the screen being preferably mounted on the closure. The screen 39 covers the mouths of the burner passages 36. At the upper end of the chamber we arrange a deflector 40, which is shaped like an inverted open cone, the object being to deliver the gas centrally to the delivery chamber so as to aid in the even distribution to the several burners. The screen thus arranged prevents explosions in the delivery chamber and back firing from one burner to the other through the delivery chamber, there being in effect two screens separating each burner tip from each of the other burner tips. The closure 38 is removable so that the screen can be readily cleaned or renewed. The closure 38 preferably consists of a cup like member 75 which fits the lower end of the chamber. The screen 38 fits into and is retained in this member by the disk 76 which clamps the inturned edge 77 on the lower end of the screen on.

The inlet passage member 41 of the burner is provided with an inlet passage 42, which delivers to the upper end of the chamber 33. The horizontally disposed inlet end of the inlet passage 42 is adapted to receive the mixing tube 44 and its delivery end registers with the delivery chamber 33. This mixing tube is arranged through the wall of the chimney, as shown in Fig. I, its air openings 48 being in the chamber 24. To support the burner, the walls of the chimney are provided with opposed openings. The outer end of the inlet passage member 41 is arranged in one of such openings and the boss-like projection 46 is engaged in the other. See Fig. II. The mixing tube 44 is shouldered to engage the outer end of the member 41. The supply valve casing 6 is provided with a nipple engaging the mixing tube whereby the mixing tube is retained and the burner is secured in position. With this arrangement, the gas is delivered from the gas nozzle close to the horizontal plane of the burners and, at the same time, an inlet passage of sufficient length is secured.

The inlet passage regulating valve 47 is threaded into the member 41 at the inner end of the horizontal portion of the inlet passage, see Fig. V. The stem 48 for the regulating valve 47 projects through the casing 22 for convenience in adjustment.

The gas delivery nozzle 49 is carried by the supply valve casing 6, the nozzle member 50 being a tubular member threaded at 51 to engage one wall of the valve casing, and provided with inlet passages 52 leading to the nozzle, which is threaded upon the end of the member 50. The nozzle regulating valve 53 is arranged longitudinally through the member 50, having a threaded portion 54, as clearly appears in Fig. VI. The nozzle is thus supported by the valve casing 6. The valve casing is removably attached to the pipe 2, as stated, by means of the sleeve coupling 8 and to the casing by means of the screws 55 arranged through the ears 56 on the valve casing.

The stem of the valve 9 is provided with a pair of stops 57 coacting with the stop 58 on the casing, one of the stops being disposed to limit the opening movement of the supply valve and the other its closing movement. The stem of the valve 9 is provided with a downwardly and outwardly projecting lever 59, which projects outwardly beyond the edge of the casing, the horizontal portion of the lever being disposed adjacent to the lever. With the lever thus arranged, the edge of the shade serves as a means for locating the valve lever and guiding a pole used for operating the valve. It will be understood that these lamps are frequently placed in elevated positions, so that they can be reached only by means of a ladder or pole, and by thus arranging the valve lever, the edge of the shade serves as a means for locating the lever and guiding the pole.

The several burners, illustrated in this structure, are supplied through a single nozzle and mixing tube, so that a single adjustment serves for all the burners and they are all supplied with the same quality of mixture. The inlet passage valve 47 also controls all of the burners.

The hood 60 is supported on the supply pipe above the chimney, it being adjustably supported as by means of the nuts 61 and 62, threaded upon the supply pipe. A gasket 63 is arranged between the nut 62 and the hood so as to seal the joint at this point.

We preferably provide a deflector 64, which is arranged in the upper flaring end of the casing, so that its edge is substantially in the same plane as the air openings 18 in the chimney. This deflector is preferably cup-shaped so that it serves as a drip cup, catching the condensation from the pipe and also serving to, in a large measure, collect the dirt or other matter blown into the top of the chimney. When the lamp is in use any condensation collected is evaporated. The deflector is supported on the under side of the coupling 3, it being provided with a raised central portion 65 fitting against the under side of the coupling, the attaching screw 66 being tapped into the coupling, as shown. This deflector serves to deflect the air or drafts blowing into the top of the chimney to the chimney openings 18 so that such down-drafts are not likely to overcome the up-draft of the chimney.

The chimney is adjustably connected to the arm 4 of the coupling member by means of the adjusting screw member 67, which is threaded through the arm 4, the attaching screw 68 being tapped into the adjusting member, as shown in Fig. II. This adjusting member may be adjusted to plumb the chimney and thus avoid the necessity of great accuracy in the manufacture of the parts and to compensate for any warping or distorting which may take place when the parts are being finished.

The pilot 69 is arranged within the chimney, the tube 70 being arranged through the chimney casing and the chimney flange 15 and connected to the arm 7 of the valve casing 6.

In the modified structure shown in Fig. XI, the screen 71 is arranged in the upper end of the delivery chamber 35. The cylindrical screen shown in Fig. V is, however, preferred—as each burner passage is thus provided with a screen and back firing from one burner to another through the delivery chamber is prevented.

Our improved lamp is well adapted for out-of-door use, or use in places exposed to drafts of air, as it is so constructed that the down-drafts through the chimney are not likely to occur, and further, the air supply to the burners is protected so that it is not likely to be effected by wind or gusts or drafts of air. The air passing through the burners, both through the mixing tube and to the burners at the point of combustion through the casing and globe, is heated somewhat and delivered at quite an even or uniform temperature. This arrangement also serves to cause a draft about the portion of the chimney in which the burners are located so that it does not become excessively heated.

We show the mantles 73 as supported from a common support 74, but as the details of this supporting means form no part of our present invention, we do not further describe the same herein.

We have illustrated and described our improvements in the form in which we have embodied them. We are aware, however, that various modifications in structural details are possible, but as these modifications will no doubt be readily understood by those skilled in the art to which this invention relates, we have not attempted to illustrate or describe the same herein, but we desire to be understood as claiming our invention specifically in the form illustrated, as well as broadly within the scope of the appended claims.

Having thus described our invention, what we claim as new and desire to secure by Letters Patent is:

1. In a gas lamp, the combination with a gas supply pipe, of a chimney comprising a downwardly-flared top and a body having an outwardly-flared upper end fitting said top, the flared portion of said chimney having air openings adjacent to its edges; a cup-like deflector supported in the flared portion of said chimney body with its edges in a spaced relation to the walls thereof and in substantially the plane of the said openings; and a burner arranged at the lower end of said chimney.

2. In a gas lamp, the combination with a gas supply pipe, of a chimney comprising a downwardly-flared top and a body having an outwardly-projecting perforated flange at its upper end, fitting said top, a deflector supported in said chimney with its edges in a spaced relation to the walls thereof and in substantially the plane of the said openings in said flange; and a burner arranged in said chimney below said deflector.

3. In a gas lamp, the combination with a gas supply pipe, of a chimney mounted on said gas supply pipe, said chimney having opposed openings in the walls thereof; an inverted burner comprising a horizontally-disposed inlet passage member arranged in one of said openings, said member being provided with a projection at its inner end adapted to engage the other opening; a mixing tube arranged in said inlet passage member and shouldered to engage the same; a supply valve casing provided with a nipple adapted to engage said mixing tube whereby said mixing tube is retained and said burner is secured in position; and an adjusting valve for said inlet passage member arranged through the chimney engaging part at the inner end thereof.

4. In a gas lamp, the combination with a gas supply pipe, of a chimney mounted on said gas supply pipe, said chimney having opposed openings in the walls thereof; an inverted burner comprising a horizontally-disposed inlet passage member arranged in one of said openings, said member being provided with a projection at its inner end adapted to engage the other opening; a mixing tube arranged in said inlet passage member and shouldered to engage the same; and a supply valve casing provided with a nipple adapted to engage said mixing tube whereby said mixing tube is retained and said burner is secured in position.

5. In a gas lamp, the combination with a gas supply pipe, of a chimney mounted on said gas supply pipe and having opposed openings in the walls thereof; an inverted burner provided with a horizontally-disposed inlet passage member adapted to receive a mixing tube at one end and having a chimney engaging member at its other end engaging one chimney opening; and a mixing tube arranged through the other chimney opening to project into said passage member and adapted to coact with the said chimney engaging member in supporting the burner within the chimney.

6. In a gas lamp, the combination with a gas supply pipe, of a chimney mounted on said gas supply pipe; an inverted burner provided with a horizontally-disposed inlet passage member adapted to receive a mixing tube; a mixing tube arranged in said passage member and shouldered to engage the same, said mixing tube being removably arranged through an opening in said chimney and supported thereby; and a supply valve casing provided with a nozzle arranged to deliver to said mixing tube and with a nipple for the outer end of said mixing tube, said mixing tube being retained by said supply valve casing and coacting to retain said burner.

7. In a gas lamp, the combination with a supply pipe, of a chimney mounted on said supply pipe; an inverted burner provided with a horizontally-disposed inlet passage member having a chimney engaging part at its inner end and adapted to receive a mixing tube; a mixing tube arranged in said inlet passage member; a supply valve casing adapted to engage said mixing tube to retain the same in position, said burner being retained by said mixing tube; and a regulating valve arranged in the chimney engaging part at the inner end of said inlet passage member.

8. In a gas lamp, the combination with a gas supply pipe, of a chimney mounted on said gas supply pipe; an inverted burner provided with a horizontally disposed inlet passage member adapted at its inner end to engage said chimney and to receive a mixing tube; and a mixing tube arranged in said passage member to secure said burner, said mixing tube being removably arranged through an opening in said chimney and being supported by the chimney.

9. In a gas lamp, the combination with a gas supply pipe, of a chimney; a casing for said chimney having air inlet openings therein; an inverted burner having a horizontally-disposed inlet passage member; a mixing tube arranged through said chimney to project into said inlet passage member, with its air inlets between said chimney and casing; and an adjusting valve for the inner end of said inlet passage provided with a stem projecting through said casing.

10. In a gas lamp, the combination with a gas supply pipe, of a chimney; a casing for said chimney having air inlet openings therein; an inverted burner having a horizontally-disposed inlet passage member; and a mixing tube arranged through said chimney to project into said inlet passage member, with its air inlet between said casing and chimney; and a valve at the inner end of said passage member adapted to be manipulated from outside of said casing.

11. An inverted burner comprising a body member having a delivery chamber therein open at its upper end; an inlet passage member having an inlet passage therein delivering to said delivery chamber, detachably connected to said body member, the outer portion of the inlet passage being horizontally-disposed; and an inlet passage regulating valve threaded into said inlet passage member at the inner end of the horizontal portion thereof.

12. In a gas lamp, the combination with a gas supply pipe, of a chimney; an inverted burner having a re-curved inlet passage, the outer portion of said passage being horizontally-disposed and extending substantially across said chimney in a plane above but adjacent to the plane of the burner; a burner tube arranged in a horizontal position through said chimney and projecting into said inlet passage; a supply valve casing connected to said supply pipe, the supply valve being located in a plane above but adjacent to the plane of the horizontally-disposed portion of said inlet passage; and a gas delivery nozzle carried by said valve casing.

13. An inverted burner comprising a cylindrical delivery chamber and a plurality of burner passages opening into the sides of said delivery chamber, the bottom of said delivery chamber being below the lower edges of the inlets of said passages to provide a trap; a cylindrical screen arranged in said delivery chamber to cover each said burner passage; and an inverted conical deflector arranged in the upper end of said delivery chamber.

14. An inverted burner comprising a cylindrical delivery chamber and a plurality of burner passages opening into the sides of said delivery chamber; a cylindrical screen arranged in said delivery chamber to cover said burner passages; and an inverted conical deflector arranged in the upper end of said delivery chamber.

15. An inverted burner comprising a delivery chamber and a plurality of burner passages opening into the sides of said delivery chamber, said delivery chamber being provided with a trap in its bottom; and an inverted conical deflector arranged in the upper end of said delivery chamber.

16. In a gas lamp, an inverted burner comprising a delivery chamber and a plurality of outwardly and downwardly projecting burner passage arms provided with passages opening into the sides of said chamber, said chamber being open at its bottom between the said arms; a screen removable through said opening in the bottom of said chamber; and a closure for said opening arranged between the said burner passage arms.

17. In a gas lamp, an inverted burner comprising a delivery chamber and a plurality of outwardly and downwardly projecting burner passage arms provided with passages opening into the sides of said chamber, said chamber being open at its bottom between the said arms; a screen common to all of the passage openings in the sides of said chamber, removable between said passage arms without otherwise disassembling the burner, and a closure for said opening arranged between the said burner passage arms.

18. In a gas lamp, the combination with the gas supply pipe, of a chimney; a chimney casing; an inverted burner having a horizontally-disposed inlet passage member; a mixing tube projecting into said passage member with its air inlet openings between said casing; a chimney and gas supply valve casing arranged on the outside of said casing to over-lap the end of said mixing tube; a removable chambered nozzle member threaded through said supply valve casing and removable from the outside thereof; a gas delivery nozzle arranged on said nozzle member and removable therewith; and a regulating valve for said nozzle threaded longitudinally into said nozzle member and adjustable from the outer end thereof.

19. In a gas lamp, the combination with the gas supply pipe, of a chimney; a chimney casing; an inverted burner having a horizontally-disposed inlet passage member; a mixing tube projecting into said passage member, with its air inlet openings within said casing; a chimney and gas supply valve casing arranged on the outside of said casing to over-lap the end of said mixing tube; a removable chambered nozzle member threaded through said supply valve casing and removable from the outside thereof; and a gas delivery nozzle arranged on said nozzle member and removable therewith.

20. In a gas lamp, the combination of a chimney having opposed alined openings; an inverted burner having a horizontally-disposed inlet passage member adapted to receive a mixing tube and shouldered at its inner end to engage one of the chimney openings; a mixing tube arranged through the opposite opening in said chimney and projecting into the inlet passage member and shouldered to engage the same; and a valve casing arranged on the outside of said chimney, provided with a nipple adapted to receive the outer end of said mixing tube whereby said mixing tube is retained in position and said burner is retained and supported thereby.

In witness whereof, we have hereunto set our hands and seals in the presence of two witnesses.

FREDERICK J. HUMPHREY. [L. S.]
HUBERT R. HUMPHREY. [L. S.]

Witnesses:
L. G. GREENFIELD,
M. P. WOODRUFF.

Copies of this patent may be obtained for five cents each, by addressing the "Commissioner of Patents, Washington, D. C."